United States Patent [19]

Verboom et al.

[11] 4,326,282
[45] Apr. 20, 1982

[54] APPARATUS FOR REPRODUCING DIGITALLY CODED INFORMATION RECORDED ON AN OPTICALLY READABLE DISC-SHAPED RECORD CARRIER

[75] Inventors: Johannes J. Verboom; Marino G. Carasso, both of Eindhoven, Netherlands

[73] Assignee: U.S. Philips Corporation, New York, N.Y.

[21] Appl. No.: 132,743

[22] Filed: Mar. 24, 1980

[30] Foreign Application Priority Data

Jan. 9, 1980 [NL] Netherlands ................ 8000124

[51] Int. Cl.³ .............. G11C 13/04; G11B 25/04; G11B 27/30
[52] U.S. Cl. .................... 369/48; 365/215; 369/124
[58] Field of Search ............ 365/215, 234; 360/37; 358/128.6; 179/100.1 G, 100.3 V; 369/47, 48, 59, 124

[56] References Cited

U.S. PATENT DOCUMENTS 3,501,586 3/1970 Russell .................... 358/132
4,238,843 12/1980 Carasso et al. ............ 365/234

Primary Examiner—Stuart N. Hecker
Attorney, Agent, or Firm—Thomas A. Briody; Robert T. Mayer; Algy Tamoshunas

[57] ABSTRACT

Disclosed is an apparatus for reproducing digitally coded information recorded on a disc-shaped record carrier in the form of optically detectable, unit information areas arranged in accordance with a concentric or spiral track pattern. The apparatus comprises a filter which is tuned to a frequency $f = V/L$, V being the nominal tangential speed of the record carrier and L the nominal center-to-center distance of said unit areas. This frequency component has a frequency equal to twice the bit frequency of the coded information and is situated at a zero point of the power spectrum of said information, so that the extracted signal may be employed for the generation of a clock signal.

1 Claim, 8 Drawing Figures

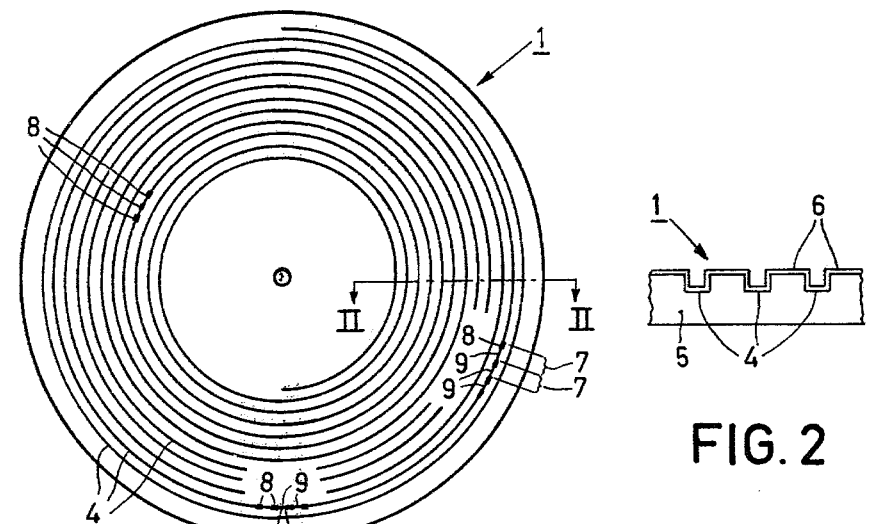
FIG. 1
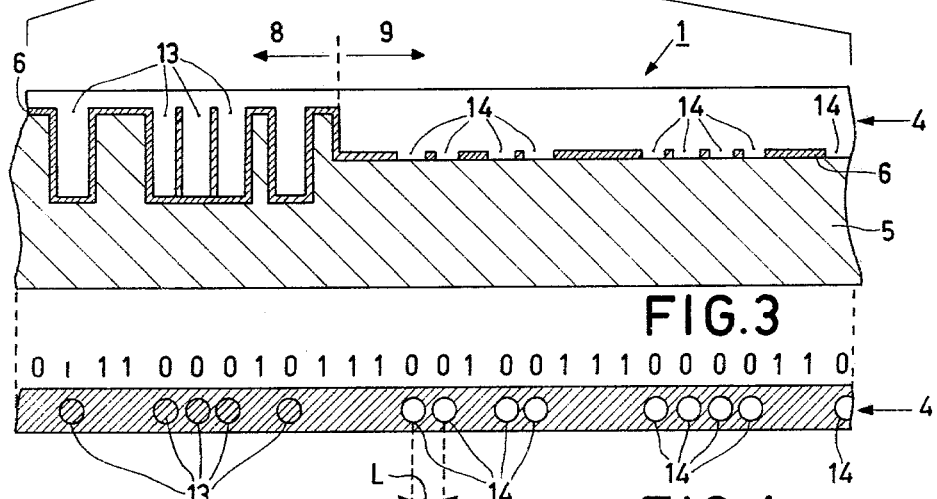
FIG. 2
FIG. 3
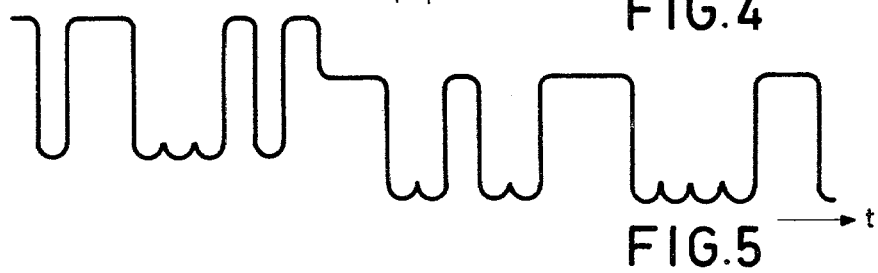
FIG. 4
FIG. 5

APPARATUS FOR REPRODUCING DIGITALLY CODED INFORMATION RECORDED ON AN OPTICALLY READABLE DISC-SHAPED RECORD CARRIER

The invention relates to an apparatus for reproducing digitally coded information, which has been recorded on a disc-shaped record carrier in the form of optically detectable, spaced apart, unit information areas arranged in accordance with a concentric or spiral track pattern. Such an apparatus comprises a light source, an optical system for projecting a light beam onto the track pattern, a detector for detecting the presence of a unit area in said beam, a read circuit for reproducing the recorded digitally coded signal, and a clock-signal generation device for synchronizing the read circuit.

The storage of information and apparatus for the reproduction of digitally coded information on an optically readable disc-shaped record carrier is known from Netherlands Patent Application No. 7802859, which has been laid open to public inspection. It has been found advantageous, inter alia for reasons of recording technology, to record the information on such a record carrier in the form of unit areas, as described in an article in IEEE Spectrum, August 1979, pages 26–33.

When recording information on such a record carrier, and especially during the reproduction of digitally coded information therefrom, synchronization is essential. The generation of a clock signal in synchronism with the information contained on the record carrier is not simple. Said Patent Application describes one technique for doing this wherein synchronization sectors are formed between information sectors on the record carrier which, in addition to the address of the information sector following it, also contain synchronization information. Guaranteeing a correct synchronism of a clock signal which is synchronized with the aid of said synchronization signal is intricate and not readily possible inter alia in the case of variations in the drive speed of the disc. In addition it is possible to synchronize a clock signal generator with the aid of the digitally coded signal being read by recovering the bit frequency therefrom, for example by differentiation of said signal being read. Such methods are electronically complex and present problems such as a poor signal-to-noise ratio or susceptibility to amplitude variations.

It is the object of the invention to provide an apparatus of the type mentioned in the preamble in which during reproduction of the recorded digitally coded information a reliable clock signal can be generated in a very simple manner.

To this end the invention is characterized in that the clock-signal generation device comprises a band-pass filter, having a center frequency which is substantially equal to twice the bit frequency of the recorded signal, for filtering the signal detected by the detector in order to obtain a clock signal, said bit frequency f complying with $f = V/2L$, where V is the nominal tangential speed of the record carrier at the location of reading and L the nominal minimum center-to-center distance of the unit areas at the location of reading.

The invention is based on the recognition that when the information is recorded in the form of unit areas, the signal being read contains a comparatively strong component having a frequency equal to twice the bit frequency of the recorded digitally coded signal, for which frequency the random power spectrum of the digitally coded signal itself exhibits a zero point, so that this frequency can be extracted in a very simple manner by filtering the information signal and may be used for the clock generation, for example by means of a phase-locked loop.

The invention will be described in more detail with reference to the drawing, in which FIG. 1 schematically represents a plan view of a record carrier in conjunction with which the apparatus in accordance with the invention may be used.

FIG. 2 is a cross-section through the record carrier of FIG. 1 taken on the line II—II.

FIG. 3 on an enlarged scale shows a part of a track of the record carrier of FIG. 1.

FIG. 4 is a plan view of the track portion shown in FIG. 3.

FIG. 5 schematically represents the signal obtained when reading a track portion in accordance with FIG. 4.

Figure 6:
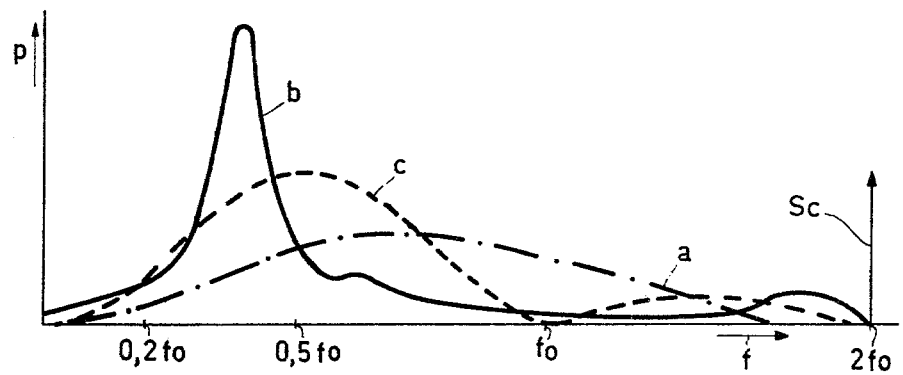
FIG. 6 represents the frequency spectra of some binary signal codings.

FIG. 1 is a plan view of a possible embodiment of a record carrier which may be used in an apparatus in accordance with the invention. The record carrier body 1 is provided with a spiral track 4. This track 4 is divided into a multitude of sectors 7, for example 128 per revolution. Each sector 7 comprises a data section 9, intended for recording data, and a synchronization section 8.

In order to ensure that the data is recorded in an accurately defined path, the track 4 is employed as servo track. For this purpose the information sections 9 of the sectors 7 exhibit an amplitude structure, as is shown in FIG. 2. FIG. 2 shows a small part of the cross-section taken on the line II—II in FIG. 1 and thus shows a number of adjacent track portions, specifically data sections, of the servo track 4. The direction of the servo tracks 4 is thus perpendicular to the plane of drawing. Said servo tracks 4, in particular the data sections 9, thus take the form of grooves in the substrate 5. In this way it is possible to make a radiation beam, which is directed at the record carrier in order to record data, accurately coincide with said servo track 4, in other words to control the position of the radiation beam in a radial direction via a servo system which employs light reflected by the record carrier. The measurement of the radial position of the radiation spot on the record carrier may be in accordance with systems similar to those employed in optical record carriers provided with a video signal and as inter alia described in "I.E.E.E. Transactions on consumer electronics", November 1976, page 307.

For recording of data, the record carrier body is provided with a layer of a material 6, which, if exposed to suitable radiation, is subject to an optically detectable change. In principle only the data sections 9 of the sectors need be provided with such a layer. However, for reasons of manufacturing technology it is simpler to provide the entire record carrier surface with such a layer. This layer 6 may, for example, be a thin layer of metal, such as tellurium. This metal layer can be melted locally by laser radiation of sufficiently high intensity, so that locally this information layer 6 is given a different reflection coefficient, as a result of which the reflected radiation beam is amplitude-modulated in accordance with the recorded information when an information track thus inscribed is scanned by a read beam.

Alternatively, the layer 6 may take the form of a double layer of materials, for example aluminium on iron, which react chemically to incident radiation. At the location where a high-power radiation beam is incident on the disc $FeAl_6$ is formed, which is a poor reflector. A similar effect is obtained in the case of a double layer of bismuth on tellurium, $Bi_2Te_3$ being formed. It is also possible to employ a single layer of tellurium.

As with the aid of the servo track in the form of a groove in the substrate 5 the write radiation spot is made to coincide accurately with said servo track, in particular when a data section is being scanned, the data modulating the write beam is exactly recorded in the data section coinciding with said servo track.

As is apparent from the foregoing the record carriers intended for the user, in which the data sections do not yet contain data, have a groove structure in said data sections within the sectors. Moreover, within each sector such a record carrier has a synchronization section 8 in the form of an optically detectable relief structure. In this case the synchronization sections 8 comprise a relief structure constituted by a sequence of recesses alternating with intermediate areas. The depth of the recesses in this structure of the synchronization section is greater than the depth of the servo track in the data section 9. This depth of the recesses is selected in accordance with general optical rules and depending on the shape of said recesses in the selected read system in such way that an optimum read-out of the information represented by the structure is obtained. In the case of a read system in which the radiation beam reflected by the record carrier is detected by a single photo-detector, $\frac{1}{4}$ λ may be selected as depth for the recesses, λ being the wavelength of the radiation used. If for the depth of the servo track in the data section 9 the value $\frac{1}{8}$ λ or less is selected, this servo track will hardly affect the amount of light detected by the detector.

FIG. 3 schematically illustrates the cross-section of the carrier in the longitudinal direction of the servo tracks 4, showing a part of such a servo track 4 with a part of the synchronization section 8 and a part of the data section 9, and FIG. 4 shows a plan view of said part of the track 4.

The prepared disc is provided with a servo track 4, formed in a substrate 5, for example by means of a laser beam. By modulating the intensity of the laser beam it is then possible to form a relief structure of "pits" 13 containing information in the synchronization section 8. Subsequently, the entire disc, including for the sake of simplicity, the portion of the record carrier 1 outside the grooves 4, may then be coated with the reflecting information layer 6. In the record carrier thus prepared information can be recorded in the information section 9 by forming holes 14 in the reflecting information layer 6, for example by means of a laser beam.

Instead of a reflecting layer 6 it is alternatively possible to provide a non-reflecting layer on a reflecting substrate, which non-reflecting layer is locally removed in order to obtain the information areas. Instead of read-out based on a different reflectivity of a record carrier, read-out may also be based on a different transmissivity of a record carrier.

The digitally coded information can be modulated in different ways. For this purpose FIG. 7 represents three modulation methods, the associated spectra being shown in FIG. 6.

Figure 7:
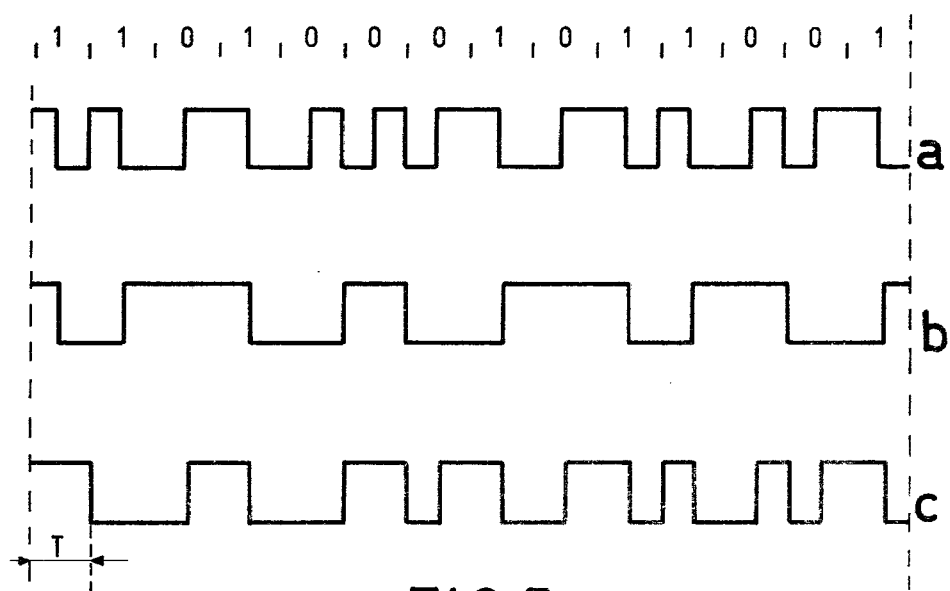
FIG. 7 shows the signal waveforms for which the spectra are given in FIG. 6, and FIG. 8 schematically represents an apparatus in accordance with the invention.

The reference a in FIG. 7 designates modulation known as "biphase" modulation. The applied digital signal is then converted into a binary signal which for a logic "one" of the applied digital signal is positive during the time interval T/2 and negative during the next time interval T/2, T being the bit length of the applied digital signal. A logic "zero" yields exactly the opposite binary signal, i.e. negative for the time interval T/2 and positive for the next time interval T/2. This modulation technique yields a binary signal which has a power spectrum as represented by a in FIG. 6. The frequency fo then corresponds to 1/T.

The reference b in FIG. 7 represents the modulation known by the name of "Miller" modulation. The binary signal generated by means of this technique has a transition halfway a logic "one" of the applied digital signal and at the transition of two consecutive logic "zeros". The frequency spectrum of the binary signal obtained by means of this modulation technique has the designation b in FIG. 6. Finally, reference c in FIG. 7 represents a modulation known by the name of "quadphase" modulation, the applied bit series of the digital signal first of all being divided into consecutive groups of two bits. From each two-bit group having a duration of 2T a binary signal is derived which in a first time interval T has the same variation as the original two bits and in the next time interval T an inverse variation. The bit combinations 11, 00, 01 and 10 which are possible are thus converted into the bit combinations 1100, 0011, 0110 and 1001 respectively. The binary signal obtained by means of this modulation technique has a frequency spectrum represented by c in FIG. 6.

It is evident from FIG. 6 that these modulation techniques have a common property in that the resulting binary signal exhibits no strong frequency components at comparatively low frequencies, for example frequencies below 0.2 fo. This is very useful when an optical record carrier is used with the associated write and read systems. As stated previously, such systems employ both servo control in order to keep the scanning spot accurately focussed on the record carrier and a servo control which controls the radial position of the scanning spot and ensures that said scanning spot accurately coincides with the information track. Since the control signals required for these servo controls are derived from the radiation beam which is reflected by the record carrier, which is also modulated by the relief structure of the synchronization section, it is essential that the frequency spectrum of the binary signal stored in the address portion does not contain any strong frequency components within the frequency band intended for the control signals. FIG. 6 thus shows that the frequency band below approximately 0.2 fo is suitable for such control signals.

When the recorded information is read it is essential that this read-out is effected in synchronism with a clock signal. According to the recognition on which the invention is based the information signal being read already contains such a clock signal when the information has been recorded in the form of unit-areas such as pits. FIG. 5 therefore schematically represents the signal obtained when reading a track in accordance with FIG. 4. The signal comprises components which are produced by the transitions between the individual pits, which in the frequency spectrum, shown in FIG. 6, appears as a comparatively strong frequency component Sc of the frequency 2 fo. This frequency coincides with a zero point in the power spectrum of a digitally coded signal of the bit frequency fo and can thus be extracted from the signal being read without any problems.

Figure 8:
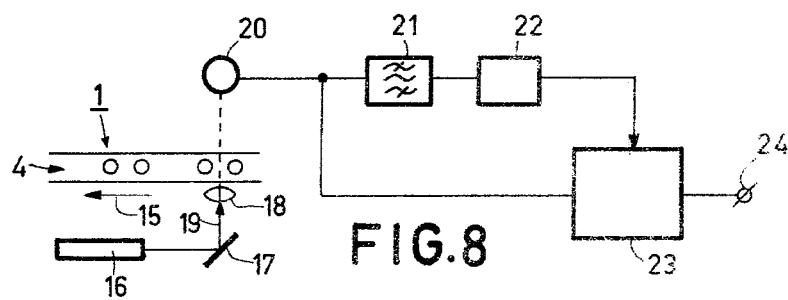

FIG. 8 schematically represents an apparatus in accordance with the invention. For the sake of simplicity various elements of the apparatus which are not essential for explaining the invention, such as the drive of the record carrier and servo controls for controlling the focusing of the laser beam and for the tracking, are not shown. These elements are inter alia described in the Patent Application mentioned in the preamble. The beam 19 from a laser 16, is projected by a mirror 17, which may also be used for radial positioning of the beam on the disc, and an objective 18 on the track 4 of the record carrier 1, which moves relative to the projected beam 19 in the direction of the arrow 5. A detector 20, for example a photo-diode, detects the reflected or transmitted radiation of the beam 19, so that a signal such as that shown in FIG. 5 is obtained. This signal contains the frequency component Sc of the frequency 2 fo (FIG. 6), which is equal to V/L, where L is the center-to-center distance of two adjacent information areas (see FIG. 4) at the location of scanning and V the tangential speed of the record carrier 1 at the location of scanning. This frequency component is extracted with band-pass filter 21 and applied to a phase-locked loop 22, which improves the filtration, increases the stability and compensates for any brief signal dropouts. Thus, a clock signal of a frequency 2 fo is obtained, from which, by division, the bit frequency fo may be recovered. This division, as is generally known may be effected in a phase-locked loop, which may comprise a highly stable oscillator whose phase is locked to the signal supplied by the filter 21.

From the signal detected by the detector 20 the digitally coded signal is recovered with a circuit 23, which for this purpose is synchronized by the clock signal obtained by a method in accordance with the invention.

The invention is not limited to a use as illustrated with reference to the Figures, but may also be employed for the reproduction of digitally coded audio or video signals and the like, for which most cases the sector arrangement with synchronization areas 8 described with reference to FIG. 1 does not occur.

Instead of a laser beam it is frequently possible to use a non-coherent light beam, especially at low information densities.

What is claimed is:

1. An apparatus for reproducing a digitally coded signal recorded on a disc-shaped record carrier in the form of optically detectable, unit information areas arranged in a concentric or spiral track pattern, said apparatus comprising means for producing a light beam, an optical system for protecting the light beam onto the track pattern, a detector for detecting the presence of a unit area in said beam, a read circuit for reproducing the recorded digitally coded signal, and a clock-signal generation device for synchronizing the read circuit, said clock-signal generation device including a band-pass filter, having a center frequency which is substantially equal to twice the bit frequency of the recorded signal, for filtering the signal detected by the detector in order to obtain a clock signal, said bit frequency f complying with f=V/2L, where V is the nominal tangential speed of the record carrier at the location of reading and L the nominal minimum center-to-center distance of the unit areas at the location of reading.

* * * * *

UNITED STATES PATENT AND TRADEMARK OFFICE
CERTIFICATE OF CORRECTION

PATENT NO. : 4,326,282
DATED : April 20, 1982
INVENTOR(S) : JOHANNES J. VERBOOM ET AL It is certified that error appears in the above—identified patent and that said Letters Patent is hereby corrected as shown below:

Claim 1, line 6, "protecting" should be
--projecting--

Signed and Sealed this

Fourteenth Day of February 1984

[SEAL]

Attest:

GERALD J. MOSSINGHOFF

Attesting Officer

Commissioner of Patents and Trademarks